(12) United States Patent
Caldwell

(10) Patent No.: US 9,646,348 B2
(45) Date of Patent: May 9, 2017

(54) INFORMATIVE GRAPHICAL REPRESENTATION OF INDIVIDUAL NET WORTH SYSTEM, METHOD AND SOFTWARE

(71) Applicant: MX Technologies, Inc., Lehi, UT (US)

(72) Inventor: John Ryan Caldwell, Provo, UT (US)

(73) Assignee: MX Technologies, Inc., Lehi, UT (US)

( * ) Notice: Subject to any disclaimer, the term of this patent is extended or adjusted under 35 U.S.C. 154(b) by 0 days.

(21) Appl. No.: 13/815,213

(22) Filed: Feb. 8, 2013

(65) Prior Publication Data

US 2014/0229346 A1    Aug. 14, 2014

(51) Int. Cl.
*G06Q 40/00* (2012.01)

(52) U.S. Cl.
CPC .................... *G06Q 40/12* (2013.12)

(58) Field of Classification Search
CPC ........ G07F 19/00; G07F 19/201; G06F 3/048; G06Q 20/10; G06Q 20/18; G06Q 20/4016; G06Q 20/405; G06Q 30/0224; G06Q 30/0255; G06Q 40/00; G06Q 40/02; G06Q 30/02
USPC .............................. 705/30, 35, 36 R
See application file for complete search history.

(56) References Cited

U.S. PATENT DOCUMENTS

| | | | | |
|---|---|---|---|---|
| 8,095,396 B1* | 1/2012 | Zublin et al. | | 705/4 |
| 8,606,674 B1* | 12/2013 | Kunz | | G06Q 40/02 705/35 |
| 8,676,689 B1* | 3/2014 | Whelan | | G06Q 40/12 705/36 R |
| 2001/0011242 A1* | 8/2001 | Allex | | G06Q 40/02 705/36 R |
| 2002/0042764 A1* | 4/2002 | Gardner et al. | | 705/35 |
| 2002/0095363 A1* | 7/2002 | Sloan | | G06Q 40/02 705/36 R |
| 2002/0128941 A1* | 9/2002 | Champion | | G06Q 40/06 705/36 R |
| 2003/0093347 A1* | 5/2003 | Gray | | 705/35 |
| 2003/0236727 A1* | 12/2003 | Champion | | G06Q 40/00 705/35 |
| 2005/0080699 A1* | 4/2005 | Snelling | | G06Q 40/02 705/35 |
| 2005/0168488 A1* | 8/2005 | Montague | | G06F 3/04845 345/659 |
| 2006/0036524 A1* | 2/2006 | Capanna | | G06Q 40/00 705/35 |

(Continued)

OTHER PUBLICATIONS

KcLau, Are you a Financial Idiot or Genius Plot Your Net Worth Chart!, Sep. 20, 2007, http://kclau.com/wealth-management/net-worth-chart-financial-planning-intelligence.*

(Continued)

*Primary Examiner* — Seye Iwarere
(74) *Attorney, Agent, or Firm* — Kunzler Law Group, PC

(57) ABSTRACT

Net worth can be graphically represented as dollars versus time. A user can zoom in on a desired section of the graphical representation in order to better discern short term net worth trends. On the zoomed in image, time and or dollars may be truncated in order to show net worth trends more distinctly. The slope of the curve between two net worth points or at any single net worth can be computed and graphically displayed to a user so that the user can understand short term net worth trends an modify behavior to improve long term net worth trends.

19 Claims, 7 Drawing Sheets

(56) References Cited

U.S. PATENT DOCUMENTS

| | | | |
|---|---|---|---|
| 2006/0089889 A1* | 4/2006 | McCarthy, Jr. | 705/30 |
| 2006/0271463 A1* | 11/2006 | Young | 705/35 |
| 2007/0055589 A1* | 3/2007 | Jameson | G06Q 10/0875 705/29 |
| 2007/0239572 A1* | 10/2007 | Harris | G06Q 40/00 705/35 |
| 2008/0027789 A1* | 1/2008 | Busch | G06Q 10/0639 705/7.38 |
| 2008/0097167 A1* | 4/2008 | Yudkovitch | A61K 31/08 600/300 |
| 2008/0204476 A1* | 8/2008 | Montague | G06F 3/04845 345/661 |
| 2008/0249925 A1* | 10/2008 | Nazari et al. | 705/38 |
| 2009/0171828 A1* | 7/2009 | Molinsky | G06Q 40/00 705/35 |
| 2009/0254469 A1* | 10/2009 | Robertson | G06Q 40/06 705/35 |
| 2009/0267904 A1* | 10/2009 | Mak-Fan | G06F 3/0416 345/173 |
| 2009/0307088 A1* | 12/2009 | Littlejohn | G06Q 30/0255 705/14.53 |
| 2009/0307587 A1* | 12/2009 | Kaneko | G06F 3/0486 715/700 |
| 2010/0088210 A1* | 4/2010 | Gardner et al. | 705/35 |
| 2010/0100424 A1* | 4/2010 | Buchanan | G06Q 20/10 705/35 |
| 2010/0100469 A1* | 4/2010 | Buchanan | G06Q 10/06 705/35 |
| 2010/0287086 A1* | 11/2010 | Harris et al. | 705/35 |
| 2011/0125672 A1* | 5/2011 | Rosenthal et al. | 705/36 R |
| 2012/0089535 A1* | 4/2012 | Hebela | G06Q 40/06 705/36 R |
| 2013/0232047 A1* | 9/2013 | Williams | G06Q 40/00 705/35 |

OTHER PUBLICATIONS

Fat Tony, Business Tips—Using a Net Worth Calculator to Achieve Financial Freedom, Fat Tony's Blog, Feb. 10, 2011, http://blog.fattonybmx.com/business-tips-using-a-net-worth-calculator-to-achieve-financial-freedom/.*

Miranda Marquit, How to Calculate Your Personal Net Worth—Definition & Calculation, Jul. 8, 2011, http://www.moneycrashers.com/calculate-personal-net-worth/.*

* cited by examiner

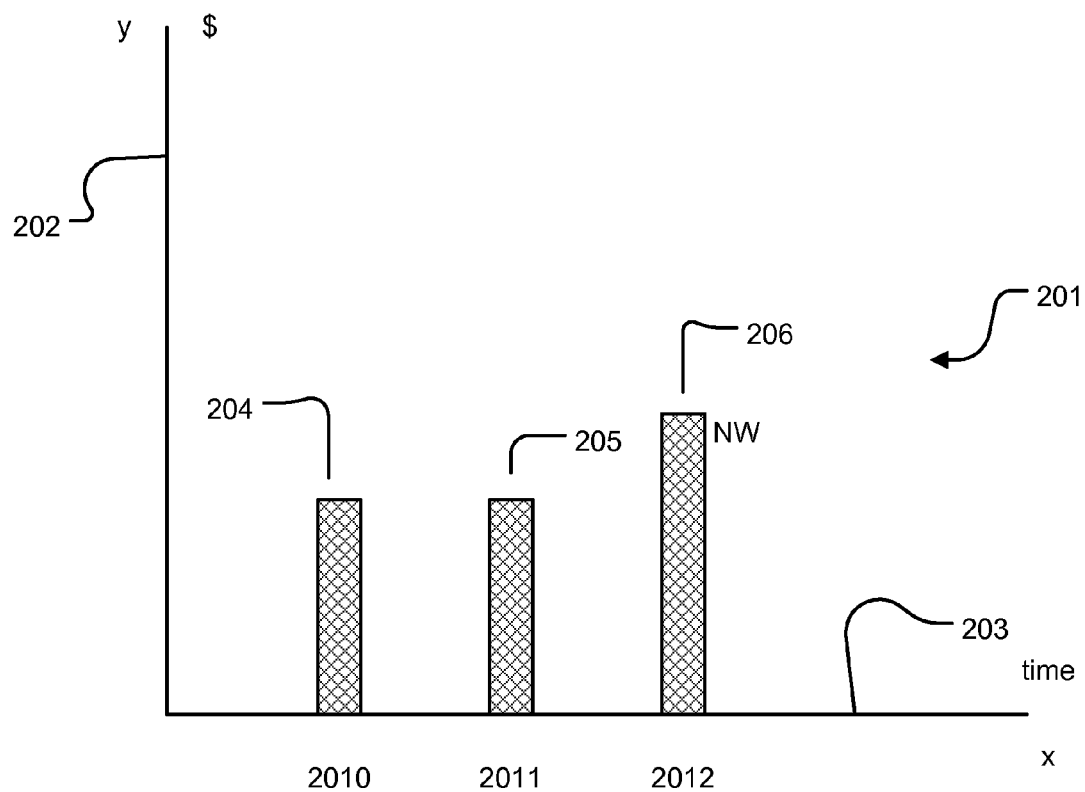

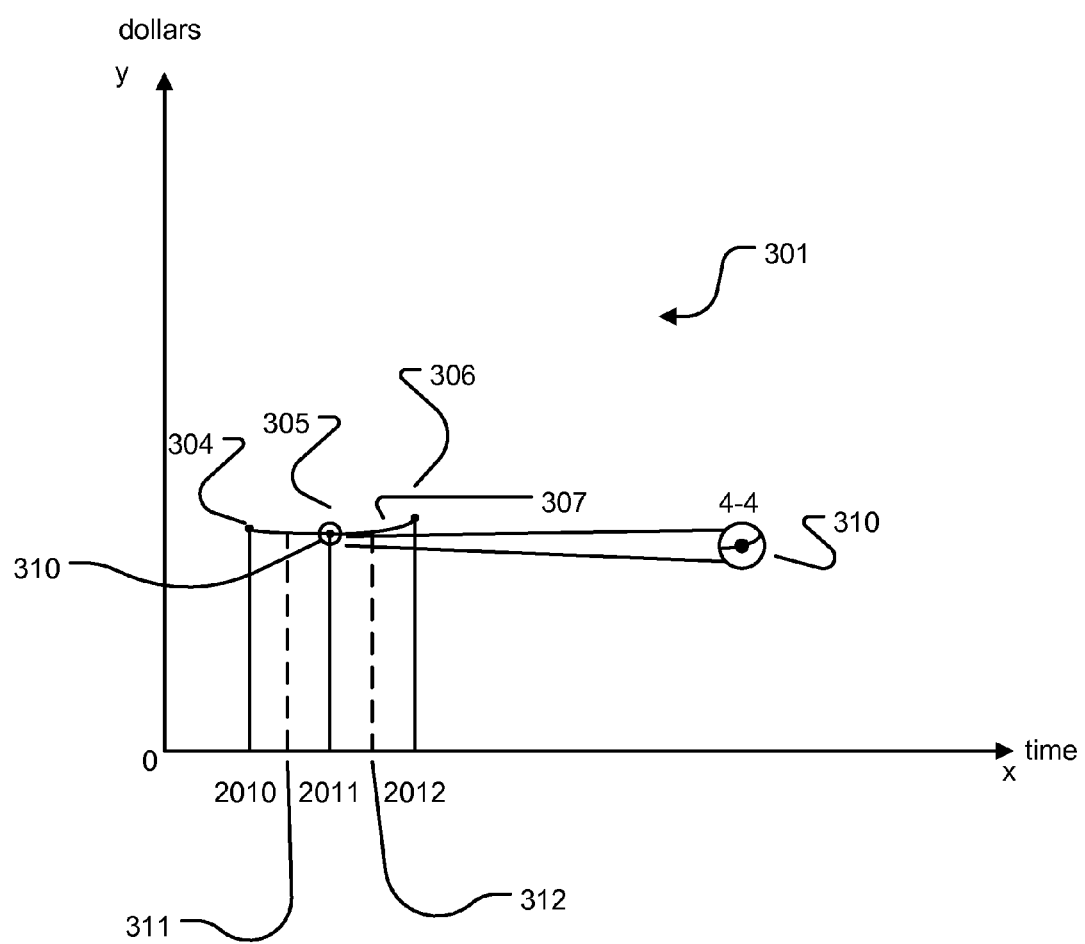

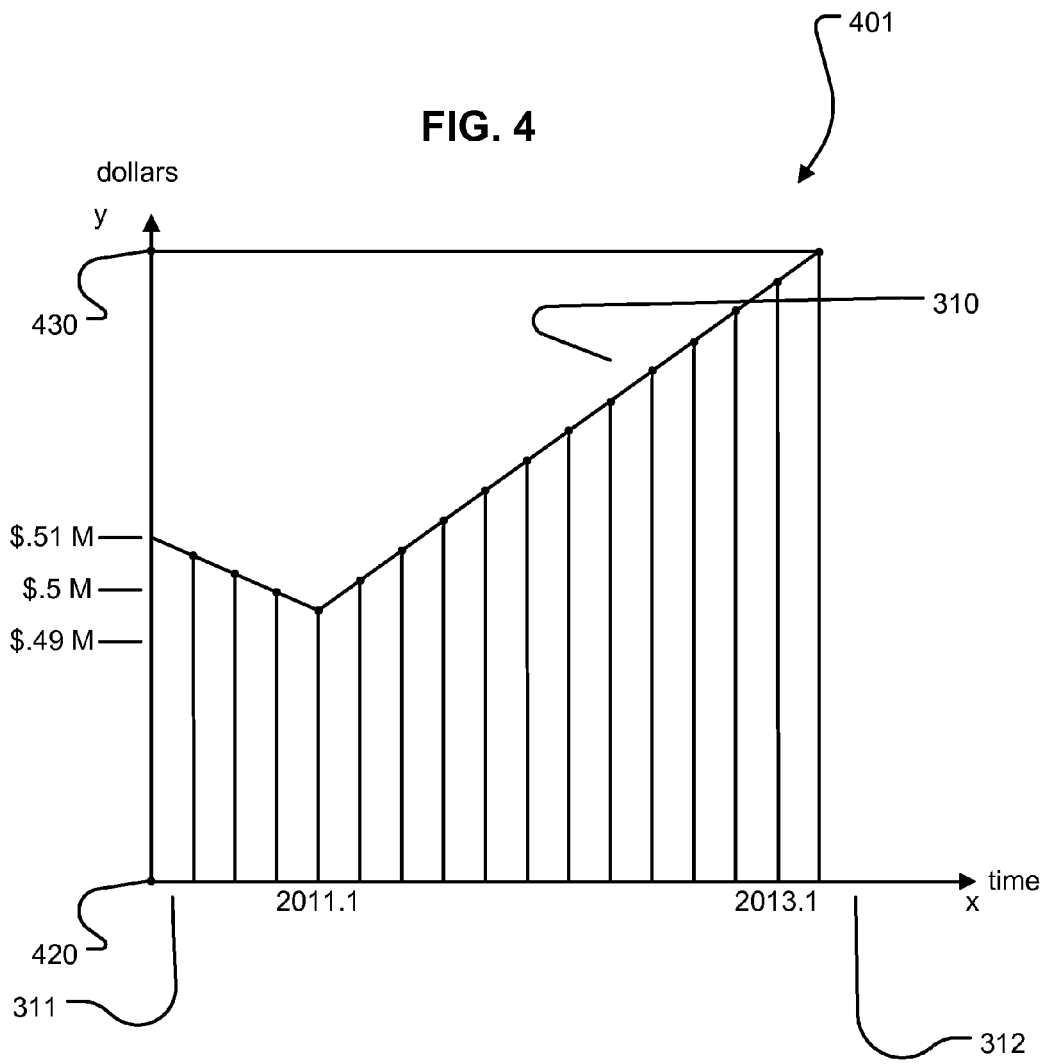

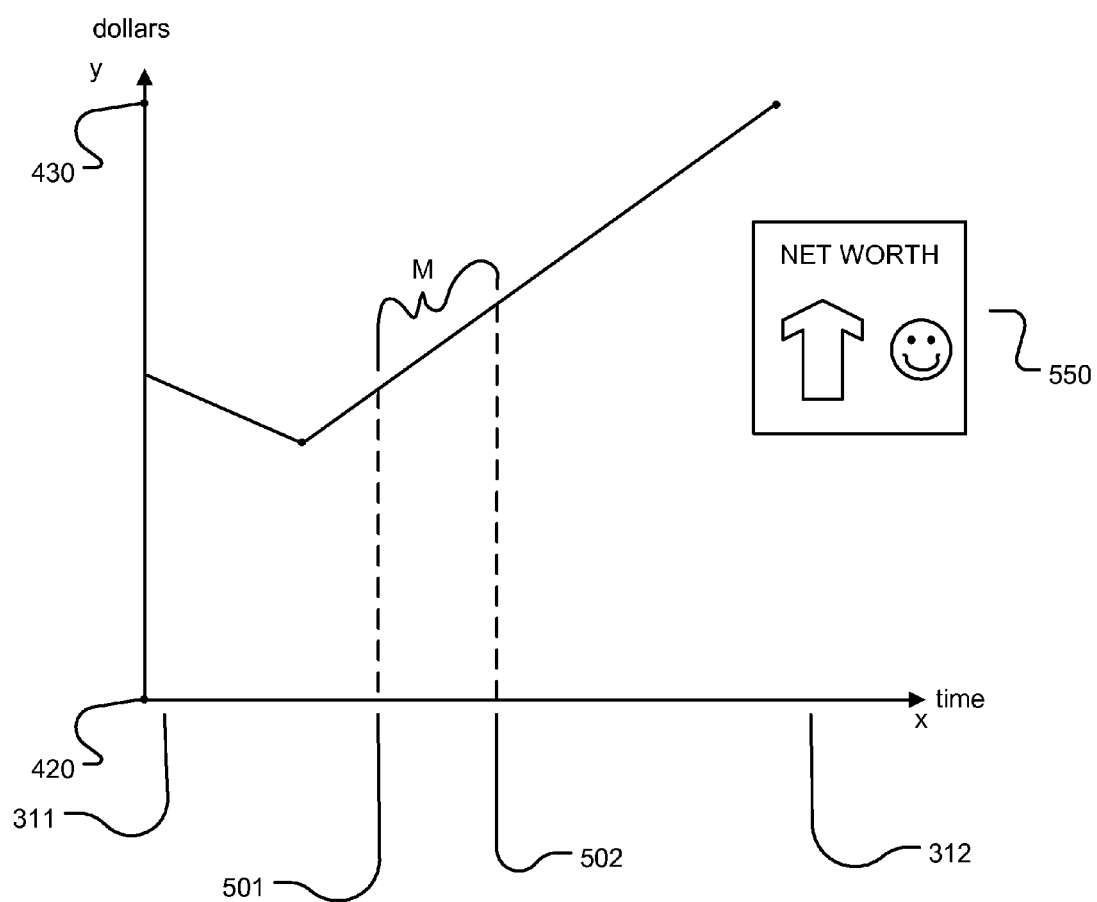

INFORMATIVE GRAPHICAL REPRESENTATION OF INDIVIDUAL NET WORTH SYSTEM, METHOD AND SOFTWARE

BACKGROUND

Currently there is a strong trend among individuals to use computer software applications to track and pay bills, conduct banking and other financial transactions, manage their personal finances and analyze their net worth.

Generally net worth ("NW") is defined as an individual's assets ("A") minus their liabilities ("L"). Assets can include cash on hand, real estate, stocks, bonds, other securities, exercisable stock options, vehicles, coin collections, stamp collections, antiques and other property of non-trivial value. Liabilities can include long-term debt such as mortgages, consumer financing debt, credit card debt, personal loans, current expenses that remain unpaid, and other non-contingent financial obligations.

When net worth is positive, an individual could in theory payoff all liabilities and be left with cash on hand to use for various purposes, such as retirement, catastrophic medical expenses, etc. When net worth is negative, the individual is in a financial hole, so to speak, and must apply future income towards liabilities to eliminate debt and build wealth.

Net worth trends are very important. Generally, an individual wishes to increase net worth both in the short term and in the long term. Building significant net worth can be a very long term process. However, in order to have a positive long-term result, the individual should focus on short term net worth trends. For example, a person who has graduated from school recently may be receiving a relatively low salary compared to monthly living expenses, leaving little money to be set aside for long-term saving or investing. However, if that recent graduate were to take a second job, or work harder in his/her primary job in order to earn quarterly or yearly bonuses, this could multiply the funds available for long-term saving and investing. Such additional funds, when viewed on a percentage basis, can create a significant positive trend in the growth of net worth. Other behaviors can have a very positive influence on net worth trends. For example, reducing unnecessary expenses such as entertainment budget, travel budget, coffee budget and restaurant budget, although perhaps not significant in absolute dollar terms, can create a significant swing in net worth trends. A short term net worth trend, if maintained over the long term, can help an individual achieve net worth goals at a much earlier date, or can allow an individual to adjust net worth goals upward.

Traditionally, net worth has been graphically represented with a pie chart or a bar graph. Referring to FIG. 1, a pie chart 101 depicts net worth as a pie 102 divided into asset 103 and liability 104 categories. This chart allows an individual to glance at the chart and immediately develop an impression of whether his/her net worth is positive or negative. Over time the individual may notice that either the asset or the liability category of the pie chart is growing, and that feedback can be used by the individual to adjust future behavior. However, changes in the pie chart must be very significant in the short term, or else observed over a very long period of time, in order to attract attention. Consequently the typical individual will view the pie chart month after month, notice no discernible change, and be unaware of any need to adjust future behaviors.

Referring to FIG. 2a, an alternative graphical representation of net worth is illustrated. A bar graph 201 is shown. The graph shows net worth in dollars (y axis) 202 versus time (x axis) 203. The time interval typically used for this type of graph was monthly or yearly. Over time the individual may or may not notice changes in the bars 204, 205, 206 which indicate changes in net worth. If an individual notices significant or unexpected changes in net worth, that could be a signal to the individual to adjust future behavior. FIGS. 2b and 2c show an alternative prior art representation of net worth and associated problems. In FIG. 2b, the theory is that net worth will be represented by bars 251, 252 and 253 in a graph 250. Each bar has an assets "A" section and a liabilities "L" section. Net worth is A−L, and is hypothetically represented by the line 254. A positive net worth will be above base line 259. In theory, the net worth line 254 will look like a heartbeat over time due to fluctuation in compensation, bonuses, inheritance, investments, unexpected expenses, recreational purchases, luxury vacations, period of unemployment, etc. However, in practice the expected representation of net worth from FIG. 2b looks like the representation shown in FIG. 2c. FIG. 2c depicts net worth bars 272, 273 and 274, each with an assets and liabilities portion. A base line 271 is zero net worth. The graph 270 does not look like a heartbeat over time, in practice. Instead, the net worth line 278 is much more of a straight line with the user unable to discern short term changes or trends in net worth. In this example, the user has a negative net worth due to an obligation such as credit card debt. Without a new career, large inheritance or lottery ticket winnings, there are not events which cause dramatic changes in net worth.

One problem with the prior art representation of net worth was that it tends to be very difficult to discern upward or downward trends in net worth. If an individual is unable to clearly discern short term net worth trends, it is impossible for the individual to attribute those net worth trends to his/her behavior (whether positive or negative). Consequently it was impossible for that individual to use a net worth graphical representation to discern which behaviors had a positive influence on net worth, which behaviors had a negative influence on net worth, and how to adjust future behavior in order to positively influence net worth.

SUMMARY

Net worth can be graphically represented as dollars versus time. A user can zoom in on a desired section of the graphical representation in order to better discern short term net worth trends. On the zoomed in image, time and or dollars may be truncated in order to show net worth trends more distinctly. The slope of the curve between two net worth points or at any single net worth can be computed and graphically displayed to a user so that the user can understand short term net worth trends an modify behavior to improve long term net worth trends.

BRIEF DESCRIPTION OF THE DRAWINGS

FIG. 2a depicts a prior art bar chart net worth representation.

FIG. 3 depicts a time versus dollars net worth representation in Cartesian coordinates.

FIG. 4 depicts a zoom-in of a section of the graph of FIG. 3 in order to focus on localized net worth trends.

FIG. 5 depicts localized net worth trends as the slope of the net worth curve at a desired point or between two points.

DETAILED DESCRIPTION

Figure 1:
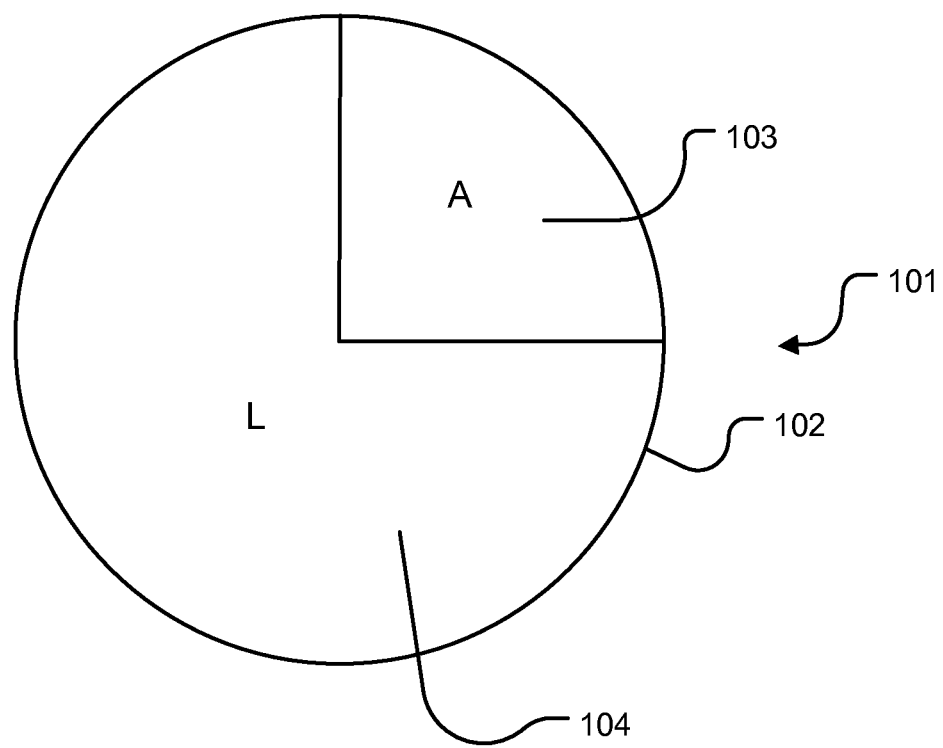
FIG. 1 depicts a prior art pie graph net worth representation.
Figure 2B:
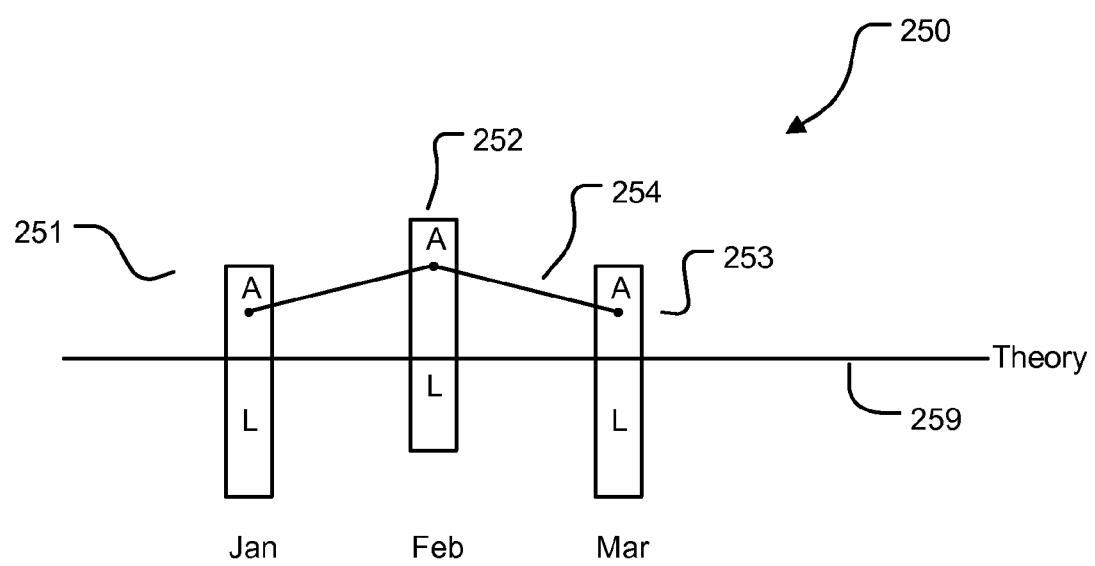
FIG. 2b depicts a hypothetical prior art net worth representation.
Figure 2C:
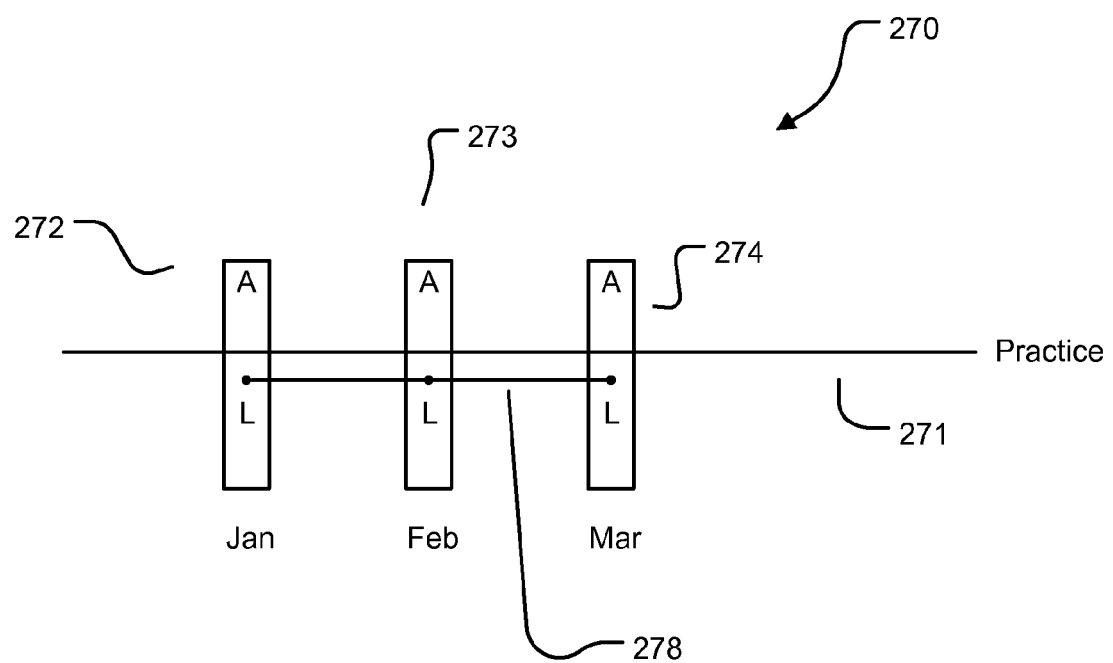
FIG. 2c depicts how that net worth representation works in actual practice.

A typical computing device may be a desktop computer, laptop computer, notebook computer, personal electronics device, smart phone, or other device capable of accepting user input, performing computations and displaying results for a user ("Computing Device"). A computing device may be digital or analog, semiconductor-based, or can use an alternative computing medium such as a biological computer, optical computer, magnetic computer, quantum computer, or other type. The Computing Device may include one or more processors capable of performing computations. The Computing Device may include short term memory for storing data to be processed or instructions to the processor(s). The Computing Device may include or have access to long term memory for storage of programs, data, and/or results of computations. The Computing Device may include a means for accepting instructions or selections from a user, such as a keyboard, touch screen or other input means, and a means for displaying results to a user, such as a printer, screen, or other type of display means which is able to permit a user to view information that could be graphical, textual or numeric.

The Computing Device may be used in conjunction with an application, program or software to perform various transactions and analyses that are of value to a user. The application could be hard-wired, hard-coded, in firmware, in software, local, remote or a combination of any of them.

For example, the application could be used to track and pay bills, conduct banking and other financial transactions, manage an individual's personal finances and investments, and analyze their net worth.

With regard to analyzing net worth, the application can use data available to it to compute net worth in the traditional manner of NW=A−L, or according to any other formula which may be desirable to use. Thus, the Computing Device would use long term memory to access the application (program) instructions and/or user data. The processor would then compute net worth. The Computing Device would then carry out application instructions to compute a graphic display of NW, such as NW over time. Finally the Computing Device would display NW on its display means so that the user can view NW.

With regard to the display of net worth on a display means, the Computing Device can display a simple set of Cartesian coordinates (x,y) where x represents a variable such as time and y represents a variable such as NW in dollar terms. An example of such a graphical display is shown in FIG. 3. The graph 301 includes an x axis for time 302 (years) and a y coordinate for net worth 303 (dollars). Each year 304, 305, 306, shows a slight change in net worth. A curve 307 is drawn using net worth data points. It is possible to use finer data points than shown, such as months or days, for a more accurate curve.

If desired, the user can simply view the curve in order to make judgments about net worth and net worth trends. This creates a simple feedback loop upon which the user may rely to evaluate the effectiveness of past behaviors in building net worth, an in order to modify future behavior in the hope of having a more positive net worth outcome in the future.

However, even this Cartesian coordinate representation of net worth falls short in being truly informative to the user. It inadequately depicts short term net worth trends which can have very significant long term influence on net worth. Changes of net worth of even several thousand dollars are lost in the magnitude of the graph and are not noticeable to the user. When those changes are not noticeable, the user may be unable to use the information as helpful feedback. Therefore the inventor has determined that it is desirable to be able to zoom in, enlarge or focus on shorter periods of time within the graphical representation of net worth for a more informative view of net worth trends.

FIG. 4 depicts an excerpt of the net worth graphical representation of FIG. 3 where the application has been used to zoom in on a section of the net worth curve 307 between years 305 and 306, thus depicting a net worth curve section 310. This curve section 310, being a zoom-in or enlargement of a particular time period of activity, shows changes in net worth more dramatically than the general trends depicted in FIG. 3. As desired, the zoom-in or focus of FIG. 4 may truncate time, and may truncate dollars as well per the focus section 4-4 shown in the next figure. Instead of depicting net worth from zero to the actual net worth amount, the graph of FIG. 4 can focus on net worth between two limits 420 and 430. The limits may be chosen in a narrow or a wide window. As an example, the limits could be chose to be one year's total net worth fluctuation.

On the net worth curve section 310 which has been focused on, two points in time are selected 311 and 312 and the net worth limits are shown as 420 and 430. This focused graph 401 has a much more dynamic curve 402. These functions are performed by the Computing Device. The dynamics of the curve more clearly illustrate to the user how net worth has changed over the period of time depicted. Once the user understands how net worth changed over that period of time, the user can reflect upon his/her behaviors which led to the net worth changes. Based on that reflection the user can then plan and/or modify future behavior to take advantage of behavior which had a positive impact on net worth and to eliminate behavior which had a negative impact on net worth.

Referring to FIG. 5, additional analysis of the net worth zoom-in of FIG. 4 is shown. In this figure, the user or the application has chosen two points in time 501 and 502 on the curve 402. The application then computes the slope um" of the curve between those two points. Slope is generally defined as rise over run, or gradient. Slope defines the steepness of the curve and whether it is positive or negative. If a single point on the curve is chosen, slope is taken of the line tangent to the curve at the desired point.

By informing the user of the slope of the curve between two points in time or at a particular point in time, the application is able to very informatively depict the short term net worth trend in question. If the slope is sharply climbing, then the behavior which produced that result should definitely be repeated. If the slope is negative, then significant behavioral adjustments may be needed. Many users may not understand the simple mathematical concept of slope. However, they are likely to understand the concept of going uphill versus going downhill. All users will understand that they want their net worth to rise, or grow into a mountain, and that they do not want their net worth to go downhill. Therefore when a user's short term net worth trends are graphically represented to a user in a manner that indicates uphill progress (a positive event) or downhill trending (a negative event), the user will very quickly understand the direction that his/her wealth is headed and will be in a better position to either take corrective action, to continue current behaviors, or to emphasize those behaviors responsible for a desirable net worth trend. A graphic such as 550 can graphically depict to the user short term net worth trend (slope) at a selected point or between two selected points.

The invention may be hard coded or hard wired into a Computing Device. More typically it is expected that the invention will be implemented as a software application which may be run on a Computing Device. Therefore the invention could be hardware or software, or a combination of them as desired. The invention may also be viewed as a system which includes the necessary hardware and software to carry out the inventive concept. The invention may also be defined as a series of method steps which are carried out to implement the inventive concept and provide the user with a useful result.

While the present invention has been described and illustrated in conjunction with a specific embodiment, those skilled in the art will appreciate that variations and modifications may be made without departing from the principles of the invention as herein illustrated, described, and claimed. The present invention may be embodied in other specific forms without departing from its spirit or essential characteristics. The described embodiment is to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A system comprising:
    a display comprising a touch screen configured to receive touch input;
    a hardware device comprising one or more of a semiconductor-based computer, a biological computer, and optical computer, a magnetic computer, and a quantum computer, the display electrically coupled to the hardware device, the hardware device being hard-wired to:
        access financial data for a user for a past period of time, and, for a plurality of points of the past period of time, compute individual net worth for the user based on the user's financial data according to the formula NW=A−L, wherein A represents an individual's assets and L represents an individual's liabilities;
        graph a first graph of NW versus time in a Cartesian coordinates system for at least a portion of the plurality of points of the past period of time;
        display the NW first graph on the display electrically coupled to the hardware device;
        receive from the user a selection of a single focus point on the first graph, the focus point comprising a central point in time of a truncated period of the past period of time on which to focus the first graph, the time period defined by the truncated period of time specified by the user, wherein the user interacts with the first graph using the touch screen to select the focus point;
        present a second graph to the user on the display electrically coupled to the hardware device based on the user's selection of the focus point on the first graph, the second graph depicting a zoomed-in image of a portion of the first graph, the second graph depicting short term net worth trend in greater detail than the first graph, the second graph including a net worth curve;
        receive from the user a selection of two points in time, T1 and T2, on the net worth curve in response to the user interacting with the net worth curve using the touch screen;
        compute slope between the selected points in time, T1 and T2, on the net worth curve; and
        graphically present to the user an indicator that indicates one of a positive net worth trend and a negative net worth trend for the user based on the computed slope of the net worth curve between the two selected points in time, the indicator comprising a graphical icon presented on the graph of the net worth curve, the indicator presented on the display electrically coupled to the hardware device.

2. The system as recited in claim 1, wherein the hardware device is further hard-wired to inform the user of the slope computation.

3. The system as recited in claim 1, wherein the hardware device is further hard-wired to display the slope on the display electrically coupled to the hardware device.

4. The system as recited in claim 1, wherein the hardware device is further hard-wired to graphically depict the slope as a net worth trend on the display electrically coupled to the hardware device.

5. The system as recited in claim 1, wherein the hardware device is further hard-wired to inform the user to reflect on his/her behavior that led to the net worth trend, and inform the user to modify future behavior based on the reflection and in response to the net worth trend displayed on the display electrically coupled to the hardware device.

6. A method comprising:
    receiving, by a hardware device, login data that corresponds to a plurality of user accounts, the hardware device comprising one or more of a semiconductor-based computer, a biological computer, an optical computer, a magnetic computer, and a quantum computer, the hardware device being hard-wired to receive the login data;
    accessing, by the hardware device, user financial data for a past period of time from the plurality of user accounts to derive a plurality of points of the past period of time and a user's net worth that corresponds with the plurality of points of the past period of time, the hardware device being hard-wired to access the user financial data, wherein the user's net worth is derived according to the formula of net worth=A−L, wherein A represents a user's assets and L represents a user's liabilities;
    generating, by the hardware device, a first graph of net worth versus time in a Cartesian coordinates system for at least a portion of the plurality of points of the past period of time, the hardware device being-wired to generate the first graph of net worth;
    displaying, by the hardware device, the net worth first graph on a digital display electrically coupled to the hardware device, the hardware device being hard-wired to display the net worth first graph, the digital display comprising a touch screen configured to receive touch input;
    receiving, by the hardware device, a user selection of a single focus point on the first graph, the focus point comprising a central point in time of a past period of time from the first graph on which to derive additional detail regarding net worth corresponding to the user selection in response to the user interacting with the first graph using the touch screen to select the focus point, the past period of time associated with the focus point being specified by the user, the hardware device being hard-wired to receive the user selection;

generating, by the hardware device, a second graph comprising the derived additional detail based on the user's selection of the focus point on the first graph and displaying the second graph on the digital display electrically coupled to the hardware device, the hardware device being hard-wired to generate and display the second graph;

deriving, by the hardware device, a slope for the plurality of points of time within the second graph in order to define short term net worth trends, the hardware device being hard-wired to derive the slope;

determining, by the hardware device, the desirability of the short term net worth trends based on the corresponding slope, the hardware device being hard-wired to determined the desirability; and displaying, by the hardware device, to the user on the digital display electrically coupled to the hardware device the short term net worth trends and a graphical indicator of the desirability of the net worth trend, the graphical indicator comprising a graphical icon presented on the graph of the net worth curve, the hardware device hard-wired to display the short term net worth trends and the graphical indicator of desirability.

7. The method as recited in claim 6, further comprising informing, by the hardware device, the user of the slope computation, the hardware device being hard-wired to inform the user of the slope computation.

8. The method as recited in claim 6, further comprising displaying, by the hardware device, the slope on the digital display electrically coupled to the hardware device, the hardware device being hard-wired to display the slope on the digital display.

9. The method as recited in claim 6, further comprising graphically depicting, by the hardware device, the slope as a net worth trend on the digital display electrically coupled to the hardware device, the hardware device being hard-wired to graphically display the slope as a net worth trend on the digital display.

10. The method as recited in claim 6, further comprising receiving, by the hardware device, from the user instructions for the modifying future behavior in response to the net worth trend displaying on the digital display electrically coupled to the hardware device, the hardware device being hard-wired to receive the instructions.

11. The method as recited in claim 6, wherein the graphical indicator of the desirability of the net worth trend is a direction indicator graphical oriented in the direction of the slope of the short term trend.

12. An apparatus comprising:
a hardware device comprising on of a semiconductor-based computer, a biological computer, and optical computer, a magnetic computer, and a quantum computer, the hardware device being hard-wired to:
access financial data for a user for a past period of time, and, for a plurality of points of the past period of time, compute individual net worth for the user based on the user's financial data according to the formula NW=A−L, wherein A represents an individual's assets and L represents an individual's liabilities;

graph a first graph of NW versus time in a Cartesian coordinates system for at least a portion of the plurality of points of the past period of time;

display the NW first graph on a display electrically coupled to the hardware device, the display comprising a touch screen configured to receive touch input;

receive from the user a selection of a single focus point on the first graph, the focus point comprising a central point in time of a truncated period of the past period of time on which to focus the first graph, the time period defined by the truncated period of time specified by the user, wherein the user interacts with the first graph using the touch screen to select the focus point;

present a second graph to the user on the display electrically coupled to the hardware device based on the user's selection of the focus point on the first graph, the second graph depicting a zoomed-in image of a portion of the first graph, the second graph depicting short term net worth trends in greater detail than the first graph, the second graph including a net worth curve;

receive from the user a selection of two points in time, T1 and T2, on the net worth curve in response to the user interacting with the net worth curve using the touch screen;

compute slop between the selected points in time, T1 and T2, on the net worth curve; and graphically present to the user an indicator that indicated one of a positive net worth trend and a negative net worth trend for the user based on the computed slope of the net worth curve between the two selected points in time, the indicator comprising a graphical icon presented on the graph of the net worth curve, the indicator presented on the display electrically coupled to the hardware device.

13. The apparatus as recited in claim 12, wherein the hardware device is further hard-wired to inform the user of the slope computation.

14. The apparatus as recited in claim 12, wherein the hardware device is further hard-wired to display the slope on the display electrically coupled to the hardware device.

15. The apparatus as recited in claim 12, wherein the hardware device is further hard-wired to graphically depict the slope as a net worth trend on the display electrically coupled to the hardware device.

16. The apparatus as recited in claim 12, wherein the hardware device is further hard-wired to graphically depicting the slope as a net worth trend on the digital display electrically coupled to the hardware device.

17. The apparatus as recited in claim 12, wherein the graphical indicator of the desirability of the net worth trend is a direction indicator graphic oreiented in the direction of the slope of the short term trend.

18. The system as recited in claim 1, wherein the hardware device is further hard-wired to graphically depicting the slope as a net worth trend on the digital display electrically coupled to the hardware device.

19. The system as recited in claim 1, wherein the graphical indicator of the desirability of the net worth trend is a direction indicator graphic oriented in the direction of the slope of the short term trend.

* * * * *